INVENTOR
NIKOLA L. JOVIC
BY [signature]
ATTORNEY

INTERCONNECTION OF QUATERNARY MATRIX POSITIONS AND JUNCTORS, TRUNKS AND FEATURES

United States Patent Office 3,452,158
Patented June 24, 1969

3,452,158
SELF-TAPERING ELECTRONIC SWITCHING NETWORK SYSTEM

Nikola L. Jovic, Chicago, Ill., assignor to International Telephone and Telegraph Corporation, a corporation of Delaware Filed Feb. 11, 1966, Ser. No. 536,501
Int. Cl. H04m 3/18
U.S. Cl. 179—18 8 Claims

ABSTRACT OF THE DISCLOSURE

This invention tapers a switching network to concentrate traffic more sharply into the paths which reach a useful outlet. The object is to eliminate useless searching and thereby reduce the probability of simultaneous firing. The system avoids noise present in earlier attempts to make similar restrictions since the tapering only occurs on a path while it is actually being fired, and does not occur while the path is being held.

This invention relates to electronic switching systems and more particularly to speech path controllers for current controlled self-seeking matrices for use in such systems. This invention is an improvement over U.S. Patent 3,204,044 entitled, "Electronic Switching Telephone System," granted Aug. 31, 1965 to V. E. Porter, and over U.S. Patent 3,221,104 also entitled, "Electronic Switching Telephone System," granted Nov. 30, 1965, to E. G. Platt et al., both of these patents being assigned to the assignee of the present invention.

A current controlled, self-seeking network does not require complex and expensive circuitry to control the selecting of switching paths and to supervise electronic crosspoints. Instead, the network relies upon the characteristics of electronically controlled switching devices, wherein a self-seeking circuit interconnects two network points via a path which includes randomly selected crosspoints (such as PNPN diodes) in cascaded switching matrices.

These crosspoints are arranged in horizontal and vertical multiples, with the verticals of one multiple connected to the horizontals of the next succeeding multiples, to provide switching matrices which may be cascaded to form a multistage switching network. When pre-selected multiples are marked simultaneously at a network inlet and outlet, electronic devices at associated idle crosspoints fire in a random manner. When the first path is completed through the network, current flows thereover to hold the diodes in the completed path in an on condition. All completing paths are self-releasing or self-blocking, depending upon such current flow. Thus, connections are completed over self-seeking paths via randomly selected crosspoints with virtually no supervision or control equipment required.

The term "random" is used above to describe a process wherein crosspoints switch "on" and "off" at the mercy of chance. Thus, the paths which race through randomly selected crosspoints are guided only by the natural selection caused by minute variations of component and circuit characteristics, by the variations of any existing charges, stray currents or potentials and by prior traffic conditions.

The Platt et al. patent describes an improvement over the Porter patent. Platt et al. continue to provide for a completely random selection of crosspoint switches. However, they provide a pre-wired configuration of gates which enabled useful while inhibiting useless searching. This gating system guides switching paths to a degree without requiring expensive markers, computers, or the like, for selecting a specific path through the network. Thus, the switching network continues to have self-selecting crosspoints which do not require expensive control circuitry. In greater detail, Platt et al. also provide the electronic switching network of intersecting multiples which are electrically joined when the associated crosspoint diodes are switched "on" and electrically isolated when the diodes are switched "off."

Again, a switching search is made over a plurality of self-seeking paths extended through the cascaded matrices via randomly selected crosspoints. Before Platt et al., many of the self-seeking paths which were explored did not extend to the second marked multiples, but were dead-end paths with respect to certain predetermined end-markings. Therefore, Platt et al. inhibited all of the dead-end paths to preclude useless searching. This inhibition resulted from the circuit configuration of a pre-wired pattern of connections extending from circuits at the destinations of the self-seeking paths to various multiples in the matrix.

The term "inhibiting," of course, refers to the blocking of a connection. One could just as well take an opposite view and use the term "allotting" or "enabling" to refer to the enabling of a connection. One term is the negative of the other; the circuit effect is the same, at least as used herein.

The circuit shown in the Platt et al. patent suffers somewhat because the continued application and removal of the enable voltages at all stages in the network tends to introduce noise into the system. In extreme cases, it is conceivable that these voltages could cause unpredictable establishment or release of a switch path at the worst, and an undue amount of noise at the best.

Accordingly, an object of this invention is to provide a new and improved control over a self-seeking matrix without introducing in-network controls which required marker-like decision making circuits. A further object of the invention is to provide a new and improved network which retains the advantages of random crosspoint selection without allowing a search over the self-seeking paths which do not extend to the second end-marking, but which are dead-end paths with respect to that end marking. Therefore, stated in another manner, an object of the invention is to inhibit all of the dead-end paths to preclude useless searching. A further object is to provide this inhibition or enablement from a pre-wired pattern of connections extending from circuits at the destinations of the self-seeking paths to various multiples in the matrix without introducing any substantial amount of noise.

In accordance with one aspect of this invention, a stage in the network is connected via a pre-wired pattern of diodes to the individual control links at the end of the network. When a link is ready to complete a connection through the network, it will apply an end-marking to the speech path and simultaneously apply an enabling marking to the diode network. The pre-wired configuration of the diode network is such that the paths which may be explored during the self-seeking search are those which lead to the end-marking. All dead-end paths not leading to the end-marking are inhibited. The application of the enable marking and pre-wired configuration is such that a minimum voltage is applied to a minimum number of multiples in the network. This way, the noise resulting from an insertion of the enabling voltage is reduced to an extremely low level which cannot cause any undesired circuit responses.

The above mentioned and other features and objects of this invention and the manner of obtaining them will become more apparent and the invention itself will be best understood by making reference to the following description of an embodiment of the invention taken in conjunction with the accompanying drawings where:

Figure 1:
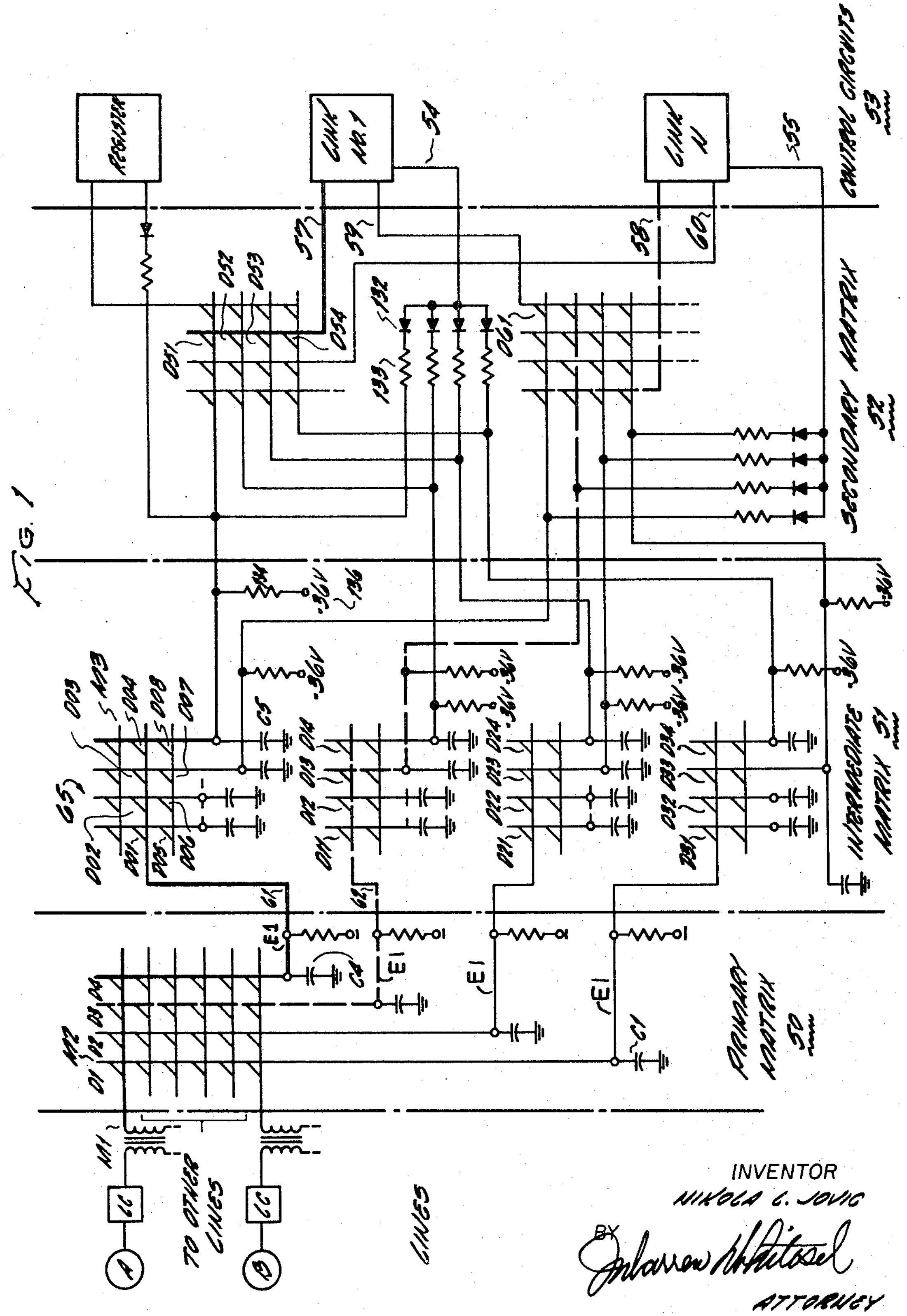
FIG. 1 is a schematic circuit diagram which shows a cascaded series of electronic switching matrices.

FIGURE 1 shows a plurality of cascaded matrices or switching arrays arranged to give automatic telephone switching service. The figure includes two exemplary subscriber lines A, B connected to the inlets of a primary matrix. Any number of line groups or primary matrices may, of course, be added. Also, the groups may be enlarged or reduced in size to include a greater or lesser number of lines.

Three cascaded stages of switching matrices or switching arrays 50–52 are here designated "primary," "intermediate," and "secondary." The switching technique applies equally well, however, to any convenient number of switching stages. Moreover, any suitable number of vertical and horizontal busses may be provided in any given matrix. A number of link, register, or other control circuits 53 control the calls which are extended through the network and provide necessary or desirable call functions such as: dial tone, busy tone, conversation timing, or the like. A number of busses 54, 55 interconnect the links and matrices to transmit matrix inhibit or enabling signals.

To request a switching path through this network of cascaded matrices, one end of the desired path is marked from a subscribed line, and the other end is marked from an alloted link circuit. For example, a calling subscriber at station A may remove a receiver or handset from a hook switch and cause an associated line circuit LC to mark horizontal multiple M1. A control circuit may be allotted so that a switch path will be extended through the network in a one-way direction to the link (i.e., the path extends from the lines toward the control circuits).

Each matrix includes first and second (or horizontal and vertical) multiples, two of which are shown at M1, M2 respectively. These multiples (which may be conductor busses) are arranged to provide a number of intersecting crosspoints. Diodes, one of which is shown at D1, are connected across each crosspoint. These diodes are any suitable electronic switch such as PNPN diodes, for example. Thus, when the switch is turned "on," the intersecting multiples are electrically connected, and when the switch is turned "off," the intersecting multiples are electrically isolated from each other.

These electronic switches turn "on" or fire when a voltage in excess of a "firing" potential is applied across their terminals. In greater detail, the vertical multiples are biased through a RC network by a first or common reference potential E1. Therefore, a crosspoint diode switch fires when a horizontal multiple is marked by a second potential which exceeds a firing potential relative to the vertical marking E1. After a crosspoint fires, the marking potential on the horizontal multiple charges a capacitor, such as C1, connected to the intersecting vertical multiple. When the capacitor charges sufficiently, a firing voltage appears on a horizontal multiple of the next cascaded matrix. Thus, the marking potential is passed on step-by-step to each succeeding cascaded matrix where diodes fire in a similar manner.

Actually, the marked horizontal multiple will have many intersecting vertical multiples (as exemplified by the diode points D1–D4 in the primary matrix of FIG. 1). Thus, if all vertical multiples are marked by a common reference potential, all diodes connected to the marked horizontal multiple M1 should theoretically fire simultaneously. This pre-supposes, however, that all diodes have exactly the same characteristics; a fact which in reality is almost never so. Actually, one diode will almost certainly fire first. Then, the common reference potential E1 on the vertical multiple lowers the marking potential on the horizontal multiple while the capacitor (such as C1) charges. This lowered potential prevents other diodes connected to the horizontal multiple from firing until after the fired diode turns off.

The end-marking is a firing pulse which provides a charging current through the fired diode to the capacitor C1. This current holds the diode "on." If, before the capacitor C1 charges, the charging current is replaced by a holding current over a completed path from a subscriber line to an allotted link, the fired diode stays "on." If not, after the capacitor C1 charges, the diode starves for want of current and switches "off." This is due to PNPN diode characteristics. After the diode switches "off," the potential on the charged capacitor C1 is a reverse bias potential which holds that diode "off" momentarily to allow another diode (such as D2) connected to the end-marked horizontal multiple M1 to switch "on." Thus, diodes switch "on" and "off" in a random manner until a self-seeking path finds its way through the cascaded matrices; all of this is explained in detail in the Porter patent.

Upon reflection, it will be apparent that the self-seeking path may include many combinations of diodes scattered through the cascaded matrices. In view of the randomness of the diode selection, many diode firings will be in useless dead-end paths with respect to the two marked end-points and a few other diode firings will be in useful paths which actually do extend between these end-marked points.

In greater detail, by an inspection of the drawings it will be seen that each subscriber line (such as A, B) connects to a horizontal multiple in a primary matrix 50. For example, line A connects to multiple M1. Each vertical multiple in a primary matrix connects to a horizontal multiple in an intermediate matrix, and each vertical multiple in the intermediate matrices connects to the horizontal multiple of a secondary matrix. Some vertical multiples in the secondary matrix connect to link inputs 57, 58 and others to the link outputs 59, 60. By inspection, it will be seen that the lines have access to link #1 via certain paths such as that shown by a heavily inked, solid line 61 and link N via other paths such as that shown by a heavily inked, dashed line switch path 62. Thus, switch path 61 is a dead-end path for calls from the lines to link N and switch path 62 is a dead-end path for calls from the lines to link #1.

Means are provided for inhibiting the search over all dead-end switching paths while enabling a search over all switching paths which may be completed between the two end-marked switching points. This inhibiting and enabling function is accomplished under the control of the link pre-selected by an allotter or scanner to complete the next call. However, as will become more apparent, the inhibiting or enabling pattern results from a pattern of wiring connections made in the factory at the time when the switching system is built. There is no need for a decision making circuit, such as a marker or computer. Therefore, expensive control circuits are not required, and the advantages of extending self-seeking paths through randomly selected crosspoints is preserved.

Next, it may be helpful to an understanding of the invention to explain why and how the enable or inhibit pre-wired pattern of busses is used. For this explanation, reference is made to FIGS. 2 and 3 which show a quaternary stage connected in cascade after the secondary stage 52 shown in FIG. 1.

Figure 2:
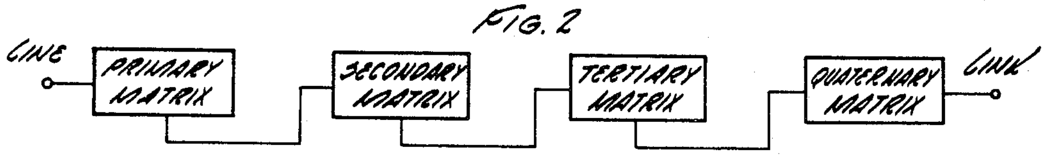
FIG. 2 is a block diagram showing an electronic network as taught in FIG. 1 and having four cascaded stages.

FIG. 2 shows four cascade stages here called primary, secondary, tertiary, and a quaternary, each stage having at least some dead-end paths therein. If PNPN diodes are allowed to fire in every one of these dead-end paths throughout four stages, the multiplication of useless searching becomes an important design consideration. If the network is increased to five stages the number of dead-end paths becomes even more important. Therefore, it is desirable to provide some means for inhibiting useless searching.

Other co-pending patent applications assigned to the assignee of this application speak of limiting the diode firings so that no dead-end searching may occur in any material. I, on the other hand, have found that in my particular network, the configuration is such that dead-end searching is not significant enough to justify the addition of inhibitions if only three stages are provided. It is when the network becomes larger that it is helpful to reduce the dead-end searching. The decision of whether to add inhibitions to a small number of stages comprised of large matrices or to a large number of stages comprised of small matrices becomes one for consideration when the matrix configuration is laid out. In my case, the greater the number of stages, the more important the useless dead-end switching may become. Therefore, I have provided a circuit for controlling the searching in the quaternary stage.

Figure 3:
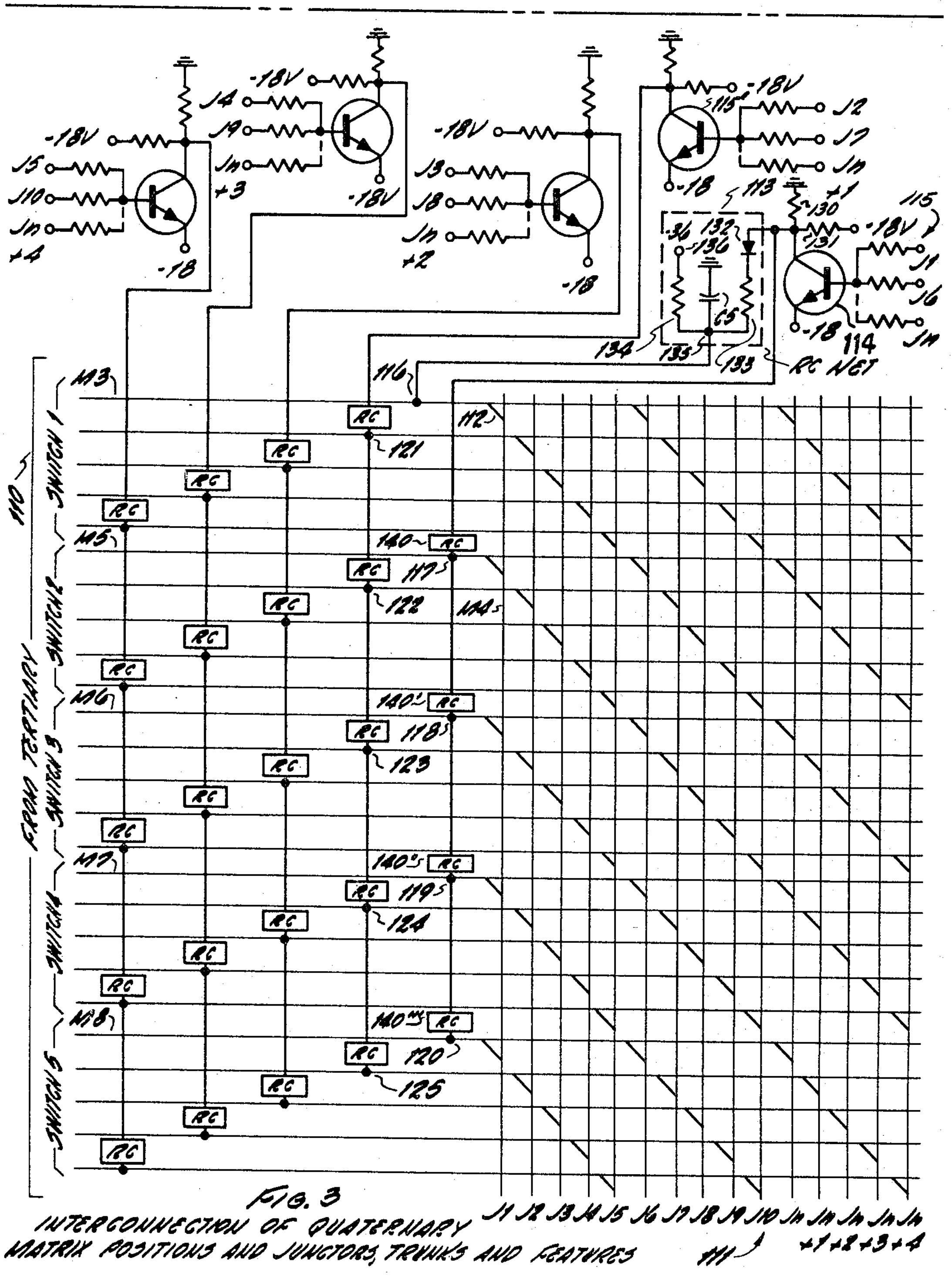
FIG. 3 shows a single matrix at the terminating end of the network which incorporates the invention.

FIG. 3 shows the quaternary stage having inlets at 110 and outlets at 111. Each outlet connects to one of the control links 53, such as link #1. As described above, each link knows which of the paths are useful for extending a connection to it. Therefore, each of the links is able to apply enabling markings to the various points on the paths which can reach that link. For example, these markings are applied via busses 54, 55 in FIG. 1.

In greater detail, the particular quaternary matrix of FIG. 3 has twenty five inlets and $N+4$ outlets. The inlets comprise a plurality of horizontal multiples, and the outlets comprise a plurality of vertical multiples as shown at M3, M4, respectively. A PNPN diode electronic crosspoint switch interconnects each of these busses at the intersections thereof, as the diode 112 interconnects the busses M3, M4.

As explained in the above identified Porter patent, it is necessary to apply a bias potential to every vertical bus outlet of a matrix in order to allow the crosspoints to select themselves. From a study of FIG. 1, it is apparent that the inlets of one matrix are the outlets of the next preceding matrix; therefore, it should be apparent that the —18 volt bias potential applied at 113 is that used at the outlet of the preceding tertiary matrix. In like manner, every other inlet to the quaternary stage also has a similar biasing network, designated "RC," associated therewith. All RC networks are identical to that drawn at 113.

Means are provided in the quaternary stage for enabling the useful searching while inhibiting the useless dead-end searching. In greater detail, I provide a plurality of electronic switch means for applying the enabling potential, one of which is shown at 114. These control terminals are connected so that each tertiary stage outlet which may be connected to the link in question is marked by that link to enable the outlet. The switch includes a number of control terminals 115 extending to the various links. Thus, for example the switch 114 is shown with reference characters to indicate that it may be marked from the link J1, J6, and J*n*. Switch 115′ is shown as being marked from links J2, J7 and $JN+1$. In a similar manner, an inspection of the drawing will inform the reader about each and every other switch which is or is not operated, depending upon the link which is seized.

Assuming that link J1 is allotted to serve the present call, a potential appears at the J1 terminal 115, and switch 114 turns on. If the switch 114 is operated, the inlets 116, 117, 118, 119, 120 are enabled. This allows any diode in the preceding stage to fire if it is connected to the vertical which is so enabled. In like manner, if the switch 115 is turned on, the inlets 121, 122, 123, 124, 125 are enabled. This allows the PNPN diodes in the preceding tertiary stage to fire if they are connected to these marked inlets.

An important aspect of the invention rests in the noise reduction aspects of this circuit. In greater detail, the switch 113 includes a voltage divider 130, 131 which sets a voltage of about —3 v. on the collector of transistor 114 when it is turned off. The enable diode 132 and resistor 133 have a very low resistive value and current does not normally flow through them; thus, substantially the —3 v. will appear at the point 135 when the transistor 114 is turned off. The resistor 134 has a resistive value which is about one hundred times larger than the resistive value of the resistor 133.

If the link J1 is allotted for the next call, a potential appears at the 115 terminal J1. The transistor 114 turns on and the full —18 volt emitter potential is applied to the anode of the enable diode 132. The —36 v. voltage 136 is negative relative to this —18 v. anode potential; therefore, the diode 132 is forward biased and the firing potential can reach its multiple M3. This negative voltage enables the tertiary stage to fire a path to multiple M3, or others.

Next, assume that a path does fire and that multiple M3 is busy. After the path is completed and the end-markings are removed, the voltages which produce the holding current divide across the path in a manner which is such that the point 135 becomes and remains more positive than the —3 volts applied to the anode of the diode 132 when the transistor 114 is off—despite the widest A.C. swing that may be reasonably anticipated. The diode 132, therefore, isolates the busy path M3, M4 from the —18 volt firing potential.

The enable diode 132 is back biased to prevent crosstalk. Conversely stated, if the enable diode 132 were not back biased so that it could conduct the voice signal current from the path including link #1 and if the enable diode in circuit 140 were also allowed to conduct the voice signal current from another link, the resistors 130, 131 would behave as a common load behaves. The two voice paths would then be effectively connected together and this cannot be allowed to happen.

Next, assume that the link J6 is allotted to serve the next call at a time when the link J1 is busy. A potential appears at the 115 terminal J6. The transistor 114 turns on and applies a potential at the RC circuits 140 and 113. Since all of these circuits are identical to the circuit 113, reference may be made to the components therein. The negative —18 volts on the emitter of the transistor 114 is applied to the diode 132 in each of the five RC circuits connected to the points 116–120. This causes the enable diode to conduct and apply an enable potential to each of the multiples M5–M8.

The point 116 is standing at approximately ground potential. Thus, when the transistor 114 turns on, the anode of enable diode 132 is at —18 volts and the cathode is at approximately ground potential. Diode 132 is back biased and no effect is felt on the multiple M3. The conversing subscribers hear no noise.

The advantages of the invention should be apparent from a reading of the above disclosure. One advantage not mentioned heretofore deals with the current requirements resulting from the turning on of an excessive number of diodes which are unable to turn themselves on, but remain switched on for a discrete period of time until they are turned off. Literature has been written and patents have been issued explaining systems of this type which experience an adverse effect from the excessive fan-out of turned on diodes. Therefore, it is worth noting that the present invention may be used to solve the problem in these other systems which do not have self-extinguishing diodes. In a well designed matrix using the principles of the Porter patent, the unused diodes turn themselves off and, therefore, there is no need for any diode to drive an excessive number of other diodes. The other end-marked networks necessarily requiring a fan-out of simultaneously turned on diodes may use the present invention to sharply reduce the problems which they counter.

While the principles of the invention have been described above in connection with specific apparatus and applications, it is to be understood that the description is made only by way of example and not as a limitation on the scope of the invention.

I claim:

1. A self-seeking current controlled network comprising a plurality of parallel connected electronic switch means interconnected to form alternative paths through said network, some of said parallel paths being dead-end paths with respect to given end-points on said network, means for individually extending a plurality of self-seeking paths between end-marked points in said network whereby at any given instant some parallel paths are busy and other parallel paths are idle and available, means comprising a pre-wired pattern of selectively energized enabling connections for inhibiting the exploration of said dead-end paths when said end-markings are applied to said network, and means for limiting the noise on said busy path when a connection is extended through said network, wherein said noise limiting means comprises means for applying an enabling potential to said pre-wired pattern of enabling connections only when the end-marking is applied to said network of electronic switches whereby the enabling potential is not applied to said pattern of enabling connections at any time except a time when the specific switch path marked by said end-marking is actually enabled to fire through said network.

2. The network of claim 1 wherein said means for enabling said path comprises a diode which is reverse biased by the potentials appearing in said network when said path is busy.

3. The network of claim 1 wherein said network comprises a plurality of cascaded matrices, there being more than three cascaded stages, each of said matrices having intersecting vertical and horizontal busses with electronic switches at each of the intersections, means for applying biasing potentials to a selected one of the horizontal busses at one end of the cascade and to a selected one of the vertical busses at the other end of said cascade to enable said switches to select themselves at random when said end-marking appears on said busses, and said pattern of connections including a plurality of electronic control switches connected to a circuit including an enabling diode in series with a resistor, a capactor, and another resistor connected to the inlets of the last matrix in said cascade.

4. The network of claim 3 and means responsive to operating said control switch for applying a forward bias to said enabling diode to end-mark said network, means responsive to the marking applied through said enabling diode for causing said extension of said path through said network, and means responsive to said extension for applying a back bias to said enabling diodes to preclude a second application to back bias said enabling diode.

5. The network of claim 3 and means responsive to the completion of a path through said network for supplying a holding voltage across the ends of said completed path whereby said holding voltage divides itself across said path to provide busy potentials at any given point along the length of said path, the busy potential appearing at the inlets of the last matrix forming a reverse bias for said enable diodes.

6. The network of claim 3 and means for allowing dead-end searching in any matrix except the last matrix, and means including said pattern of connections for limiting the number of said switch means which are able to fire to those switch means which are in useful paths through said network.

7. A switching network comprising a plurality of cascaded switching stages for providing a plurality of alternative paths through said network, means associated with the two ends of said paths for marking selected end-points, means for exending one of said plurality of paths between said two selected end-points on a random search, self-selection basis, means associated with the inlets of the last stage in said cascade for selectively limiting the number of paths which can be fired to that stage, means responsive to said end-marking means at the end of said cascade for selectively controlling said path limiting means, diode means for selectively applying said end-markings to said end-points for providing said path limiting, and means responsve to the completion of a path through said network for back biasing said diode whereby busy paths are not enabled.

8. The network of claim 7 wherein each of said stages comprises a plurality of crosspoint switches, electronic enabling switch means having a control electrode connected to every one of said end-marking means having access to a given set of crosspoint switches in said last stage, means responsive to operation of said enabling switch means for enabling said set of crosspoint switches to extend a path to the one of said end-marking means which is then operating said enabling switch, and means during busy conditions of the individual ones of said set of switch means for precluding a selection of said busy switch means.

References Cited

UNITED STATES PATENTS

| | | | |
|---|---|---|---|
| 3,201,520 | 8/1965 | Bereznak | 179—18 |
| 3,221,104 | 11/1965 | Platt et al. | 179—18 |

KATHLEEN H. CLAFFY, *Primary Examiner.*

D. L. RAY, *Assistant Examiner.*